United States Patent [19]

Tanaka et al.

[11] Patent Number: 5,737,158
[45] Date of Patent: Apr. 7, 1998

[54] MAGNETIC HEAD DEVICE WITH TAPE GUIDE SECONDARY PORTIONS MOLDED ONTO TAPE GUIDE PRIMARY PORTIONS OF DIFFERING MATERIAL

[75] Inventors: Shigeru Tanaka, Niigata-ken; Haruhiko Yoshida, Fukushima-ken, both of Japan

[73] Assignee: Alpse Electric Co., Ltd., Tokyo, Japan

[21] Appl. No.: 559,515

[22] Filed: Nov. 15, 1995

[30] Foreign Application Priority Data

Nov. 15, 1994 [JP] Japan ............................. 6-305652
Jun. 21, 1995 [JP] Japan ............................. 7-178150

[51] Int. Cl.⁶ ............................. G11B 15/60; G11B 5/105; G11B 5/49
[52] U.S. Cl. ............................. 360/130.21; 360/129; 360/104
[58] Field of Search ............................. 360/130.21, 129, 360/130.31, 130.3, 130.33, 104

[56] References Cited

U.S. PATENT DOCUMENTS

| | | | |
|---|---|---|---|
| 4,293,884 | 10/1981 | Schiller | 360/129 |
| 4,586,098 | 4/1986 | Pretto | 360/104 |
| 4,589,043 | 5/1986 | Grundtner | 360/122 |
| 4,757,411 | 7/1988 | Matsunaga | 360/129 |
| 4,860,141 | 8/1989 | Yoshimura | 360/130.21 |
| 4,894,737 | 1/1990 | Hamana et al. | 360/129 |
| 4,948,833 | 8/1990 | Araki et al. | 524/508 |
| 5,134,536 | 7/1992 | Komatsu et al. | 360/130.21 |
| 5,202,808 | 4/1993 | Saito | 360/130.21 |
| 5,253,135 | 10/1993 | Hamana | 360/130.21 |

FOREIGN PATENT DOCUMENTS

| | | | |
|---|---|---|---|
| 0532012 | 3/1993 | European Pat. Off. | 360/130.21 |
| 62-067758 | 3/1987 | Japan | 360/130.21 |
| 01-235057 | 9/1989 | Japan | 360/130.21 |
| 05-266551 | 10/1993 | Japan | 360/130.21 |
| 06-103657 | 4/1994 | Japan | 360/130.21 |
| 06-195825 | 7/1994 | Japan | 360/130.21 |

*Primary Examiner*—Craig A. Renner
*Attorney, Agent, or Firm*—Guy W. Shoup

[57] ABSTRACT

A magnetic head device includes a magnetic head, a mount on which the magnetic head is provided, and first and second pairs of tape guides. The first tape guides are provided on the mount at positions approximately adjacent to and on opposite sides of the magnetic head. The second tape guides are provided on the mount at positions separated from the magnetic head such that one of the first tape guides is positioned between each of the second tape guides and the magnetic head. The mount is formed of a high-accuracy material, and the first and second tape guides are formed of materials having low friction properties which include portions molded into holes provided in the high-accuracy material to form an integral unit. The inner wall of one of the projections of each of the first tape guide is formed as a perpendicular surface and the inner wall of the other projection of each of the first tape guides is formed as an inclined surface. The inner walls of both projections of the second tape guides are formed as perpendicular surfaces.

17 Claims, 10 Drawing Sheets

18 MICRON; DISTANCE BETWEEN TOF OF MAGNETIC TAPE SLIDING SURFACE OF MAGNETIC HEAD AND UPPER END OF REFERENCE HOLE OF CASING OF CASSETTE TAPE 3.35 ; HEIGHT 0

18 MICRON; DISTANCE BETWEEN TOF OF MAGNETIC TAPE SLIDING SURFACE OF MAGNETIC HEAD AND UPPER END OF REFERENCE HOLE OF CASING OF CASSETTE TAPE 3.35; HEIGHT 0

MAGNETIC HEAD DEVICE WITH TAPE GUIDE SECONDARY PORTIONS MOLDED ONTO TAPE GUIDE PRIMARY PORTIONS OF DIFFERING MATERIAL

BACKGROUND OF THE INVENTION

1. Field of the Invention

The present invention relates to a magnetic head device to be incorporated in a cassette tape recorder and the like, and more particularly to a magnetic head device which improves the stability of recording/reproducing properties with respect to azimuth, mechanical strength, mechanical properties and sliding properties thereof.

2. Description of the Related Art

FIGS. 12 and 13 show an example of a conventional magnetic head device to be used for a cassette tape recorder which has been proposed by the assignee.

Referring to the drawings, a magnetic head 1 includes a substantially box-shaped shielding case 2 formed of Permalloy and the like in which magnetic cores 3 for use in recording, reproducing and erasing are loaded, shielding plates 4 provided between the magnetic cores 3, resin charged into a space formed in the shielding case 2 and an electric circuit (not shown) connected to the lower portion thereof. A magnetic tape sliding surface 5 of the top surface of the magnetic head 1 is shaped to swell in the direction of sliding of a magnetic recording medium (magnetic tape) 6.

The magnetic head 1 is secured to the mount 7. The mount 7 is integrally molded by a synthetic resin material such as a plastic or the like, and consists of tape guides 8, a frame 9 provided at the lower portion of the tape guides 8 and mounting portions 10 provided on both right and left sides of the frame 9 (the left side mounting portion is not shown in FIG. 12).

The tape guides 8 consists of tape slide-contact portions 8a for guiding the running of the magnetic tape 6 and projections 8b and 8c formed at both ends of the tape slide-contact portions 8a. Perpendicular surfaces 8d which are normal to the tape slide-contact portions 8a are formed on the projections 8b. On the projections 8c, inclined surfaces 8e are formed which separate from the perpendicular surfaces 8d and incline to the tips of the projections 8c as they extend from the ends of the tape slide-contact portions 8a. The tape slide-contact portions 8a are curved to allow the magnetic tape to slide smoothly thereon and to reduce the contact resistance therebetween. Boltholes 10a (the left side bolthole is not shown in FIG. 12) for attaching the magnetic head to a tape recorder and the like are formed in the mounting portions 10.

To manufacture the magnetic head device constructed as describe above, the magnetic head 1 is positioned on the mount 7 by an external special positioning means and thereafter, attached to the mount 7 with an adhesive such as a resin ingredient.

When recording, reproducing and erasing of the magnetic tape 6 are performed by the tape recorder provided with the above magnetic head device, the magnetic tape slides on the tape slide-contact portion 8a and an end 6a in the width direction of the magnetic tape 6 slides on the inclined surfaces 8e of the projections 8d, as shown in FIG. 13. By the sliding of the end 6a of the magnetic tape 6 on the inclined surfaces 8e, the magnetic tape is pressed toward the perpendicular surfaces 8d and eventually runs while abutting against the perpendicular surfaces 8d. By this, the magnetic tape 6 is positioned by the projections 8b, and runs with the azimuth adjusted automatically with respect to a gap line 3a on the tape sliding surface 5. In addition, since the magnetic tape 6 is forcibly slid on the tape guides 8, soft materials having excellent sliding properties have been used for the tape guides. Accordingly, there are almost no problems of falling-off of magnetic powder and wear of the tape guides due to the sliding of the magnetic tape on the surfaces of the tape guides formed of soft materials.

The conventional magnetic head device as described above has very excellent phase properties because the azimuth of the magnetic head is automatically adjusted, and has good sliding properties because soft materials having good sliding (low friction) properties are used for the tape guides. However, the conventional magnetic head device has insufficient follow-up properties (properties that a gap of the magnetic head follows deflection of the azimuth angle).

Thus, in order to improve follow-up properties, a magnetic head device 11 is proposed in which the conventional magnetic head device is integrally provided with tape guides to be inserted into a tape guide insertion openings adjacent to a magnetic head insertion opening formed in a casing of a cassette tape, as shown in FIGS. 14 to 16.

A magnetic head 1 is secured to a mount 17. The mount 17 is integrally molded by a synthetic resin material such as a plastic or the like, and consists of first tape guides 18, second tape guides 28 and a frame 19 provided at the lower portions of the first and second tape guides 18 and 28.

The first tape guides 18 consist of connecting portions 18a and projections 18b and 18c formed at both ends of the connecting portions 18a. Perpendicular surfaces 18d which are normal to the connecting portions 18a are formed on the projections 18b, and perpendicular surfaces 18e are formed on the projections 18c. Likewise, the second tape guides 28 consists of tape slide-contact portions 18a, projections 28b and 28c, and perpendicular surfaces 28d and 28e.

The magnetic head device thus constructed is very excellent in follow-up properties, but poor in phase properties because it does not have azimuth adjusting function like the conventional magnetic head device as described above. Furthermore, since the device itself increases in size, the material having good mechanical strength and mechanical accuracy upon assembly are required for the magnetic head device, and sufficient sliding properties cannot be obtained when such materials are selected. Thus, as shown in FIGS. 15 and 16, the second tape guides 28 allow the magnetic tape 6 to slidably move on the tape slide-contact portions 28, but the first tape guides 18 does not allow the magnetic tape 6 to slidably move on the connecting portions 18a. This may avoid the generation of magnetic powder due to the sliding of the magnetic tape on the surface of hard materials, but there still causes such generation of magnetic powder. In addition, the magnetic head device has a problem that the second tape guides wear away.

SUMMARY OF THE INVENTION

It is an object of the present invention to provide a magnetic head device having excellent follow-up properties and phase properties without loss of mechanical strength, mechanical accuracy and sliding properties thereof.

According to a first aspect of the present invention, there is provided a magnetic head device comprising a magnetic head, a mount on which the magnetic head is provided, and tape guides which are provided on the mount, wherein the mount and the tape guides, which are formed of different materials, are combined to form an integral unit.

According to a second aspect of the present invention, there is provided a magnetic head device comprising a magnetic head, a mount on which the magnetic head is provided; first tape guides provided on the mount at positions approximately adjacent to the magnetic head; and second tape guides provided on the mount at positions separated from the magnetic head, wherein the mount, the first tape guides and the second tape guides, which are formed of different materials, are combined to form an integral unit.

According to a third aspect of the present invention, there is provided a magnetic head device, wherein one of the first and second tape guides on at least either the magnetic tape lead-in side or the magnetic tape lead-out side are integrally molded by the same material.

According to a fourth aspect of the present invention, there is provided a magnetic head device, wherein the mount is formed of a high-accuracy material and the tape guides are formed of the materials having high sliding (low friction) properties.

According to a fifth aspect of the present invention, there is provided a magnetic head device, wherein the main ingredient of the mount consists of at least one of polyphenylene sulfide, a liquid crystal polymer, polyether imide and aromatic polyamide, and wherein the main ingredient of the tape guides consists of nylon 12.

According to a sixth aspect of the present invention, there is provided a magnetic head device, wherein the mount is formed of a material having high mechanical properties and vibration damping properties, and wherein the tape guides are formed of the materials having high sliding properties.

According to a seventh aspect of the present invention, there is provided a magnetic head device, wherein the main ingredient of the mount consists of a metal having a low melting point such as a zinc alloy, a lead alloy and an aluminum alloy, and wherein the main ingredient of the tape guides consists of nylon 12.

According to a eighth aspect of the present invention, there is provided a magnetic head device, wherein the inner wall of one of the projections of each of the first tape guides is formed as a perpendicular surface and the inner wall of the other projections of each of the first tape guides is formed as an inclined surface, and wherein the inner walls of both of the projections of the second tape guides are formed as perpendicular surfaces.

According to a ninth aspect of the present invention, there is provided a magnetic head device, wherein the perpendicular surface of one of the projections of each of the first tape guides and the perpendicular surface of one of the projections of each of the second tape guides are aligned.

According to a tenth aspect of the present invention, there is provided a magnetic head device, wherein guide widths of the first tape guides are smaller than those of the second tape guides.

In accordance with the first aspect of the invention, the materials suitable for the function of the tape guides can be used for the tape guides, and the materials suitable for the function of the mount can be used for the mount.

In accordance with the second aspect of the invention, the materials suitable for the function of the tape guides can be used for the tape guides, and the materials suitable for the function of a large mount can be used for the large mount.

In accordance with the third aspect of the invention, positions of runners and gates upon molding can be arbitrarily provided in good balance by integrally molding the first and second tape guides.

In accordance with the fourth and fifth aspects of the invention, by using the high-accuracy material for the mount and by using the materials having high sliding properties for the tape guides, it is possible to attach the mount securely to the magnetic head device upon fastening threads, and it is also possible to provide a mount which does not change in scale with the change of environment such as temperature and humidity. Furthermore, the generation of magnetic powder due to the sliding of the magnetic tape can be prevented, and wear of the tape guides can be also prevented.

In accordance with the sixth and seventh aspects of the invention, by using the material having mechanical properties and vibration damping properties for the mount and by using the materials having high sliding properties for the tape guides, it is possible to dampen mechanical vibrations transmitted to the mount from the outside. Furthermore, the generation of magnetic powder due to the sliding of the magnetic tape can be prevented, and wear of the tape guides can be also prevented.

In accordance with the eighth aspect of the invention, the inner wall of one of the projections of each of the first tape guides is formed as the perpendicular surface, the inner wall of the other projection of each of the first tape guides is formed as the inclined surface, and the inner walls of both projections of the second tape guides are formed as perpendicular surfaces. Thus, the running range of the magnetic tape in the width direction thereof near the magnetic head can be restricted by controlling the displacement of the magnetic tape in the width direction thereof to some extent with the second tape guides at the positions far from the magnetic head, and one edge portion of the magnetic tape can be controlled by the first tape guides at the positions near the magnetic head.

In accordance with the ninth aspect of the invention, the perpendicular surface of one of the projections of each of the first tape guides and the perpendicular surface of one of the projections of each of the second tape guides are aligned. Thus, running properties of the magnetic tape becomes more stable so that phase properties of the magnetic head device are improved.

In accordance with the tenth aspect of the invention, the guide widths of the first tape guides are smaller than those of the second tape guides. Thus, large external forces acting on the magnetic tape can be reduced by the second tape guides and the reduced external forces can be reduced further by the first tape guides so that follow-up properties of the magnetic head device are improved.

DESCRIPTION OF THE PREFERRED EMBODIMENTS

Figure 1:
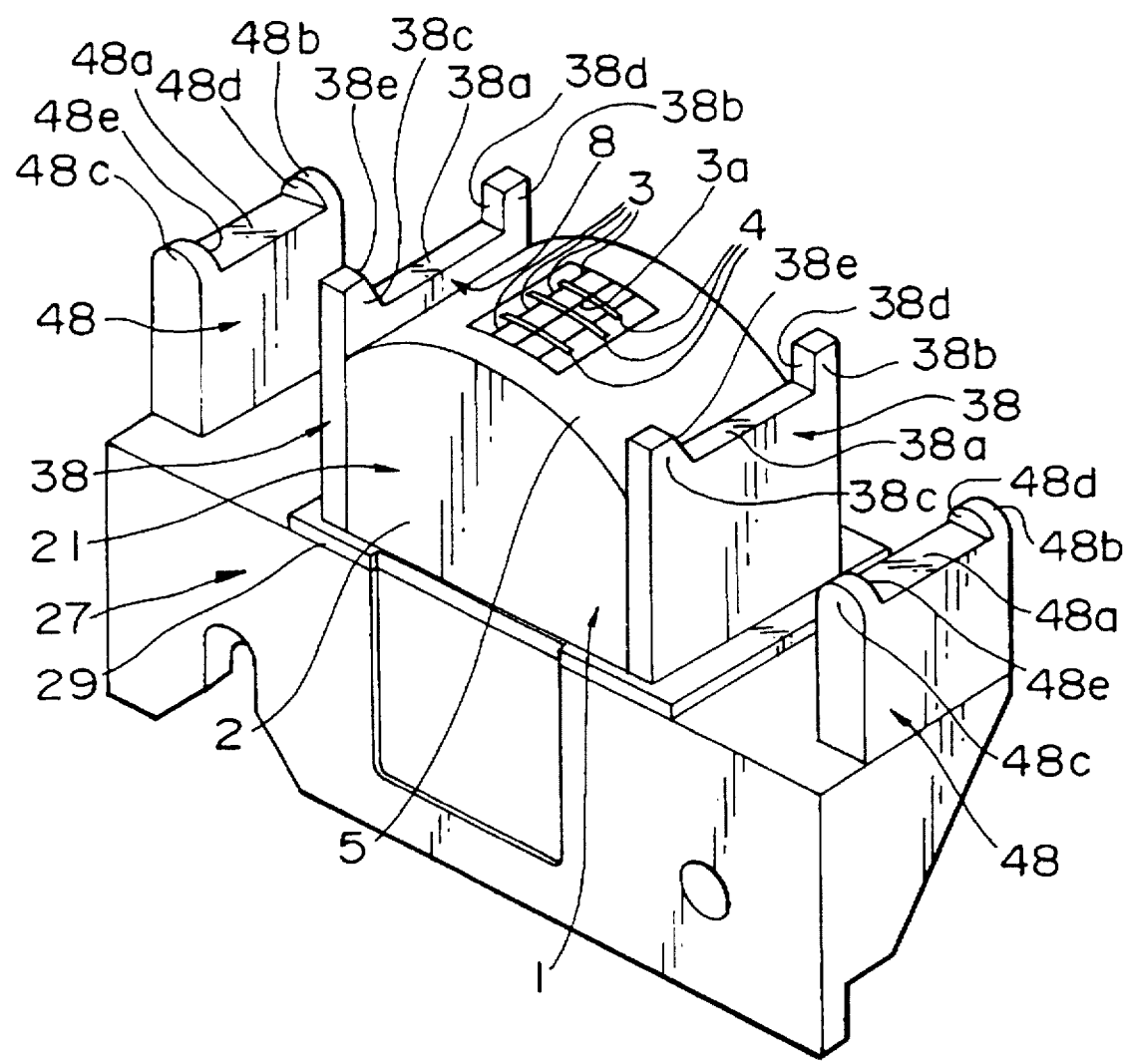
FIG. 1 is a perspective view showing an embodiment of a magnetic head device according to the present invention.

FIG. 1 is a perspective view showing an embodiment of the present invention. In the drawing, the same components as those of the conventional magnetic head device are indicated by the same reference numerals to omit the description thereof.

A magnetic head device 21 of the present invention has the following basic features.

1) A mount 27, first tape guides 38 and second tape guides 48, which are formed of different materials, are combined to form an integral unit.

2) The mount 27 is formed of a high-precision material, such as at least one of polyphenylene sulfide, a liquid crystal polymer, polyether imide and aromatic polyamide, and first and second tape guides 38 and 48 are formed of a material having high sliding (low friction) properties, such as nylon 12.

3) An inner wall 38d of one of projections 38b of each the first tape guides 38 is formed perpendicular to a sliding surface of the slide-contact portions 38a, and an inner wall 38e of the other projection 38c of each of the tape guides 38 is formed at an inclined (obtuse) angle with respect to the sliding surface, and further, inner walls 48d and 48e of both projections 48b and 48c of the second tape guides 48 are formed perpendicular to the sliding surfaces of the sliding-contact portions 48a.

4) The perpendicular surface 38d of one of the projections 38b of each of the first tape guides 38 and the perpendicular surface 48d of one of each of the projections 48b of the second tape guides 48 are aligned.

5) Guide widths of the first tape guides 38 (distances from the perpendicular surfaces 38 to the inclined surfaces 38e in tape slide-contact portions 38a) are smaller than those of the second tape guides 48 (distances from the perpendicular surfaces 48d to the perpendicular surfaces 48e in tape slide-contact portions 48a).

The above features 1) and 2) will be described first.

Since the mount 27, the first tape guides 38 and the second tape guides 48, which are formed of different materials, can be combined to form an integral unit, the materials having excellent mechanical strength and mechanical accuracy can be used for the necessary portions thereof and the materials having excellent sliding properties can be used for the sliding portions. Thus, a magnetic head device having various optimum properties can be designed, so that the materials having excellent sliding properties can be used for the tape guides in the conventional magnetic head device having excellent follow-up properties. Therefore, since there will be caused little generation of magnetic powder due to sliding of a magnetic tape on the tape guides, the inner wall of any one of the projections of the tape guides can be formed as an inclined surface. Therefore, it becomes possible for the conventional magnetic head device to have the azimuth adjustment function in addition to the excellent follow-up properties.

In addition, since the mount 27, the first tape guides 38 and the second tape guides 48, which are formed of different materials, can be combined to form an integral unit, resonance of the magnetic head device can be controlled, as compared with the unit formed of a single material. Particularly, since the tape guides have a damping effect by the use of soft materials having good sliding properties, vibrations from a cassette unit can be effectively dampened.

A method of forming the integral unit by combining the mount 27, the first tape guides 38 and the second tape guides 48, which are formed of different materials, will now be described.

Figure 2A:
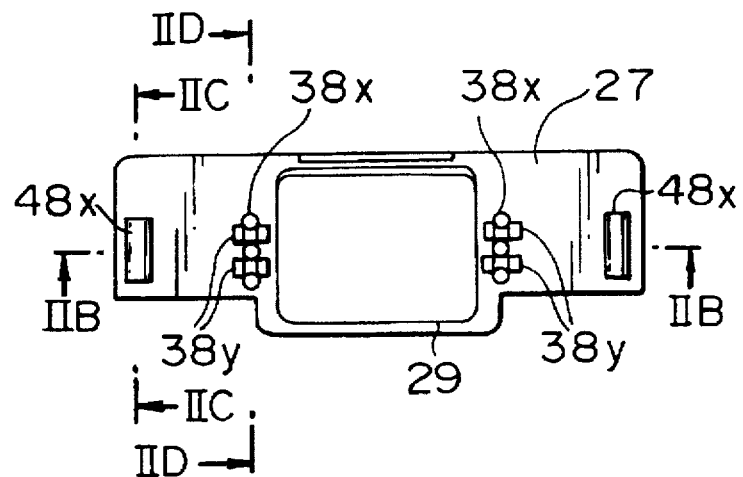
FIGS. 2A, 2B, 2C and 2D are views showing the molding of a primary side.
Figure 2B:
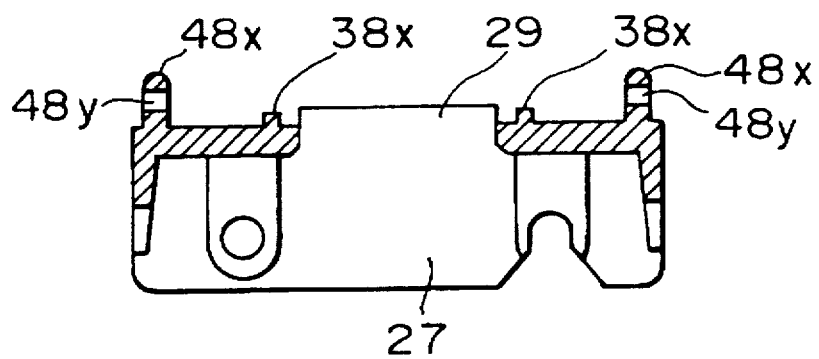
Figure 2C:
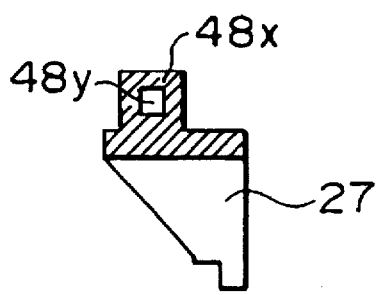
Figure 2D:
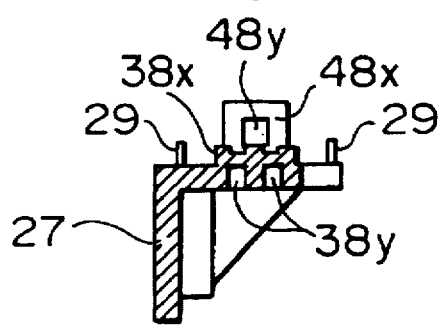

FIGS. 2A to 2D show the molding of the primary (base) portion the integral unit in which FIG. 2B is a sectional view taken on line IIB—IIB of FIG. 2A; FIG. 2C is a sectional view taken on line IIC—IIC of FIG. 2A; and FIG. 2D is a sectional view taken on line IID—IID of FIG. 2A. The materials having excellent mechanical strength and mechanical accuracy are used for the primary portion. Projections 38x are provided at positions where the first tape guides are provided, and holes 38y are formed so as to prevent separation of the materials of the secondary portion of the unit. Likewise, projections 48x are provided at positions where the second tape guides are provided, and holes 48y are formed to prevent fallout of the materials of the secondary portion of the unit. Furthermore, a part of a mounting frame 29 is also provided.

Figure 3A:
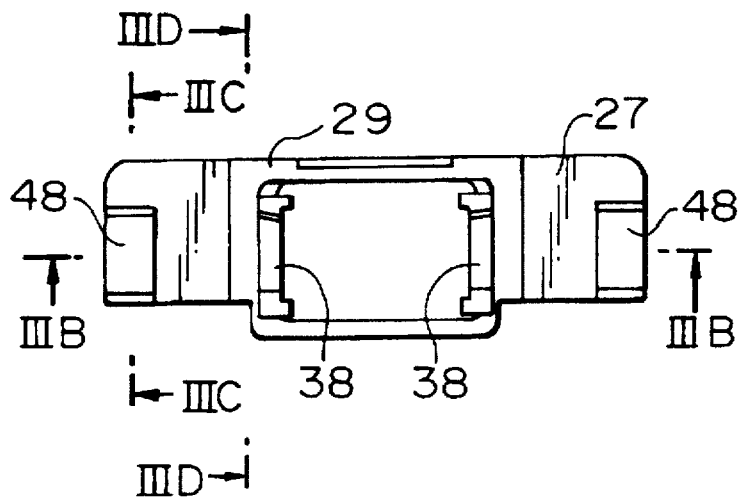
FIGS. 3A, 3B, 3C and 3D are views showing the molding of a secondary side after the primary side is molded.
Figure 3B:
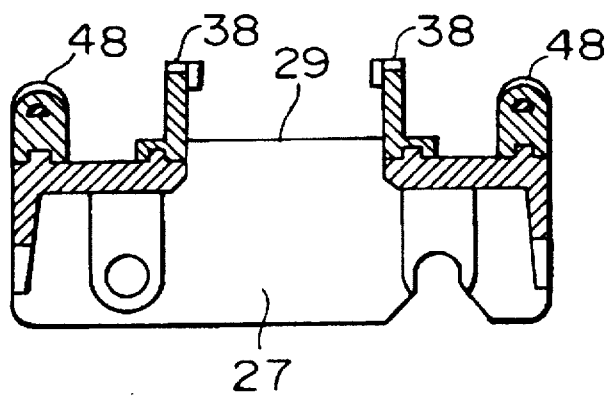
Figure 3C:
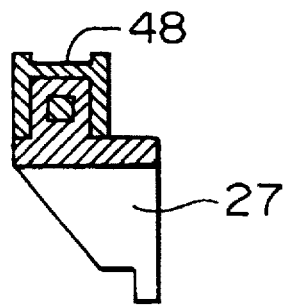
Figure 3D:
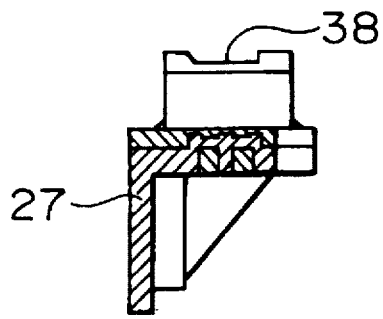

FIGS. 3A to 3D show the molding of the secondary portion of the integral unit after the primary portion is molded in which FIG. 3B is a sectional view taken on line IIIB—IIIB of FIG. 3A; FIG. 3C is a sectional view taken on line IIIC—IIIC of FIG. 3A; and FIG. 3D is a sectional view taken on line IIID—IIID of FIG. 3A. In each of the cross sections shown in FIGS. 3B to 3D, the diagonally shaded portions are formed of materials of the primary portion and the secondary portion, respectively. At this time, by filling the holes 38y formed in the primary portion with the materials of the secondary portion, separation of the materials of the secondary portion can be prevented.

By adopting the molding method as described above, even if warpage is caused at the primary portion in the unit and the projections 38x are distorted, the unit can be molded with the projections of the tape guides located at proper positions when a molding die of the secondary portion has exact accuracy, so that accuracy of the tape guides can be more improved than ever.

As shown in FIGS. 2A to 2D and 3A to 3D, the primary portion and the secondary portion of the first tape guides are joined by forming vertically the holes 38y in the primary portion and by sliding the secondary portion thereinto (vertical sliding). On the other hand, the primary portion and the secondary portion of the second tape guides are joined by forming laterally the holes 48y in the primary portion and by sliding the secondary portion thereinto (lateral sliding). With respect to the second tape guides, the above vertical sliding may be effectively adopted. By adopting the vertical sliding, it is possible to reduce the volume of the tape guides, to prevent molding deformation thereof, and to reduce the material cost thereof. In addition, by adopting the vertical sliding with respect to both of the first and the second tape guides, it is possible to form the holes 38y and 48y in the same direction. Thus, a space within a die can be efficiently laid out so that a multi-cavity mold can be favorably utilized.

Figure 4A:
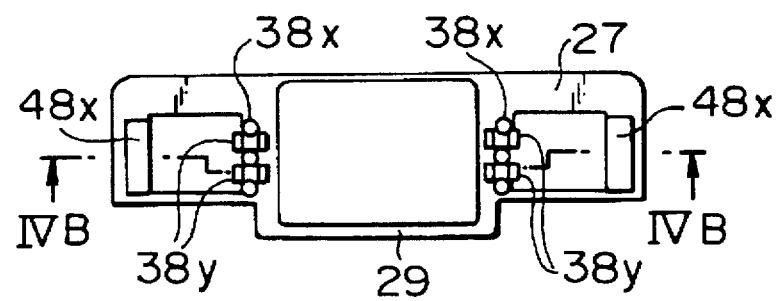
FIGS. 4A, 4B, 4C and 4D are views showing the molding of a primary side and the molding of a secondary side after the primary side is molded according to another embodiment the present invention.
Figure 4B:
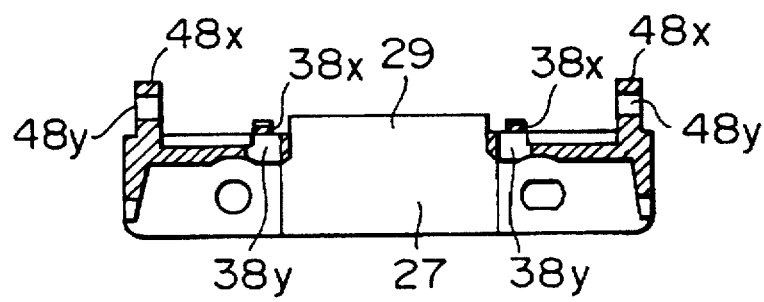
Figure 4C:
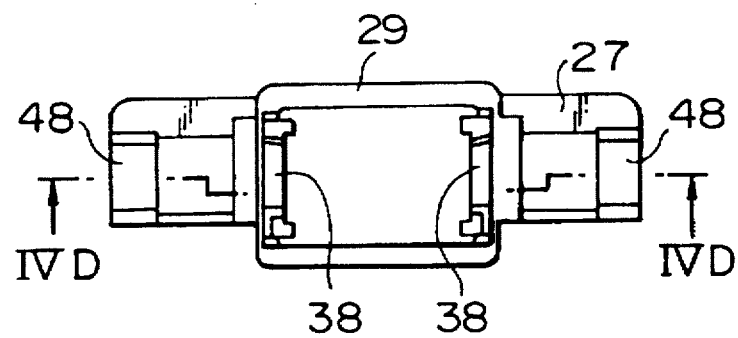
Figure 4D:
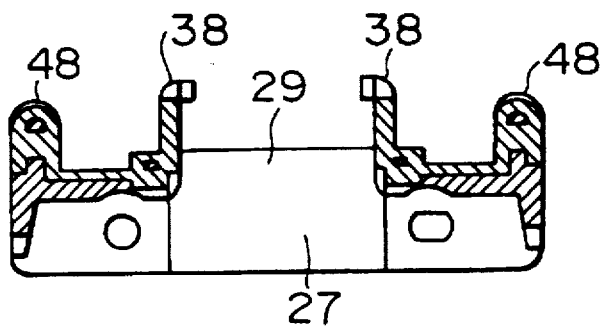

Another embodiment of a method of forming the integral unit by combining the mount 27, the first tape guides 38 and the second tape guides 48, which are formed of different materials, will now be described. FIG. 4A shows the molding of the primary portion, FIG. 4B is a sectional view taken on line IVB—IVB of FIG. 4A, FIG. 4C shows the molding of the secondary portion after the primary portion is molded, and FIG. 4D is a sectional view taken on line IVD—IVD of FIG. 4C. In this embodiment, the first and second tape guides at magnetic tape lead-in and lead-out sides are formed of the same materials and connected to each other so as to be integrally molded (the dark shaded portions in FIG. 4D), so that positions of runners and gates upon molding can be arbitrarily provided in good balance. For example, with respect to the positions of the gates, at least four sections are required upon molding in the embodiment shown in FIGS. 2A to 2D and 3A to 3D, but the number of sections can be reduced to two in the embodiment shown in FIGS. 4A to 4D. By this, filmy burrs which have been likely to be generated on die surfaces due to turbulence upon molding the secondary portion can be removed. In addition, defects which are caused on sliding surfaces of the first or the second tape guides due to surface roughness such as a flow mark and a gas mark (for example, burn mark, silver streak, haze and mold deposit) can be eliminated by changing the flow of resin. Furthermore, generating sections of welds produced by a collision of resins poured into the die from different sides can be formed at positions far from the sliding surfaces, and the number of generating sections of welds can be reduced. This can improve strength of the whole molded article.

In the embodiment shown in FIGS. 4A to 4D, the first and second tape guides of at least one of the magnetic tape lead-in and lead-out sides may be connected by the materials of the secondary portion so as to be integrally molded. However, it may be also effective when all of the first and second tape guides at magnetic tape lead-in and lead-out sides are connected by the materials of the secondary portion to be integrally molded.

The materials to be used for the primary and the secondary portions will now be examined.

Material properties with respect to accuracy, stability and strength in examining the materials of the primary portion are shown in Table 1.

TABLE 1

| Base resin | | Accuracy, Stability | | | | | Strength | | |
|---|---|---|---|---|---|---|---|---|---|
| | | Water absorption % | Mold shrinkage factor | | Linear thermal coefficient of expansion × $10^{-5}$/°C. | Heat deformation temperature °C. | Bending modulus of elasticity GPa | Bending strength MPa | Tensile strength MPa |
| | | | MD % | TD % | | | | | |
| PPS | A | 0.02 | 0.15 | 0.60 | 2.5 | 260 | 15.7 | 147 | 118 |
| | B | 0.03 | 0.15 | 0.25 | 2.3 | 260 | 16.7 | 118 | 78 |
| | C | 0.02 | 0.20 | 0.40 | 1.8 | 260 | 15.6 | 221 | 171 |
| LCP | D | 0.02 | 0.14 | 0.35 | 2.0 | 175 | 19.6 | 173 | 134 |
| | E | 0.02 | 0.26 | 0.34 | 2.8 | 250 | 11.8 | 84 | 68 |
| PEI | | 0.21 | 0.26 | 0.50 | 2.3 | 210 | 9.8 | 157 | 114 |
| Aromatic PA | | 0.19 | 0.27 | 0.69 | 2.3 | 230 | 13.5 | 223 | 189 |
| POM | | 0.20 | 1.38 | 1.64 | 7.8 | 140 | 4.2 | 116 | 76 |
| PBT | | 0.07 | 0.61 | 1.23 | 2.8 | 190 | 8.9 | 174 | 115 |
| PA 66 | | 1.10 | 0.51 | 0.80 | 2.5 | 235 | 8.2 | 214 | 141 |
| PA 12 | | 0.16 | 1.16 | 2.34 | 5.5 | 146 | 3.8 | 90 | 59 |
| ABS | | 0.20 | 0.39 | 0.59 | 4.5 | 81 | 5.9 | 71 | 47 |
| PC | | 0.20 | 0.52 | 0.59 | 4.7 | 135 | 3.6 | 112 | 71 |

From the Table 1, the following matters may be considered.

Polyacetal (POM) and nylon 12 (PA 12) are not suitable for the materials of the primary portion because each of them have a high mold shrinkage factor, a high linear thermal coefficient of expansion, a low thermal deformation temperature and a low bending modulus of elasticity. Polybutylene terephthalate (PBT) is not suitable for the materials of the primary portion because it has a high mold shrinkage factor. Nylon 66 (PA 66) is not suitable for the material of the primary portion because it has a very high water absorption. Acrylonitrile-butadiene-styrene copolymer (ABS) is not suitable for the material of the primary portion because it has a high linear thermal coefficient of expansion, a low thermal deformation temperature, a low tensile strength and a low bending strength. Polycarbonate (PC) is not suitable for the material of the primary portion because it has a high linear thermal coefficient of expansion, a low thermal deformation temperature and a low bending modulus of elasticity.

On the contrary, polyphenylene sulfide (PPS), a liquid crystal polymer (LCP), polyether imide (PEI) and aromatic polyamide (aromatic PA) are suitable for the material of the primary portion because each of them have a high water absorption, a low mold shrinkage factor, a low linear thermal coefficient of expansion, a high thermal deformation temperature, a high bending modulus of elasticity and a high tensile strength.

Dimensional accuracy, moldability, wear resistance, flaking of magnetic powder and tape damage of the materials to be used for the secondary portion are summarized in Table 2 below.

TABLE 2

| Base resin | Dimensional accuracy | Moldability | Wear resistance | Magnetic powder falling-off | Tape damage |
|---|---|---|---|---|---|
| PA12  A | Δ | ⊚ | ⊚ | ⊚ | ⊚ |
|   B | ○ | ○ | ⊚ | ⊚ | ⊚ |
|   C | ○ | ○ | ⊚ | ⊚ | ⊚ |
| PA66-PPS | ⊚ | X | X | X | X |
| PA12-aromatic PA | ⊚ | ○ | X | X | X |
| Aromatic PA | ⊚ | ⊚ | X | X | X |
| PPS | ⊚ | ○ | X | X | X |
| PBT | ○ | ○ | ○ | ○ | ○ |
| LCP | ⊚ | ○ | Δ | Δ | X |

⊚: Excellent
○: Good
Δ: Fairly good
X: Poor

It is apparent from Table 2 that the nylon 12 is the most suitable material for the secondary portion. Also, it is apparent from Table 2 that because of high thermal deformation temperature of the materials of the primary portion, the primary portion and the secondary portion can be molded accurately if the injection temperature of the materials of the secondary portion is lower than the thermal deformation temperature of the materials of the primary portion. From the examination of this point, it was found that the primary portion and the secondary portion could be molded accurately when the nylon 12 was used for the materials of the secondary portion.

Dimensional accuracy, electrical stability (antistatic properties), strength, impact resistance and vibration damping properties of the materials including metals to be used for the materials of the primary portion are summarized in Table 3.

TABLE 3

| Base resin properties | Dimensional accuracy | Electrical stability | Strength | Impact resistance | Vibration damping |
|---|---|---|---|---|---|
| Zn alloy die casting | Δ | ○ | ⊚ | ⊚ | ○ |
| Al alloy die casting | Δ | ○ | ⊚ | ⊚ | ○ |
| Zn alloy injection molding | ○ | ○ | ⊚ | ⊚ | ○ |
| Al alloy injection molding | ⊚ | ○ | ⊚ | ⊚ | ⊚ |
| Pb alloy injection molding | Δ | ○ | ○ | ○ | ○ |
| Stainless sheet metal working | Δ | ○ | Δ | Δ | Δ |
| PPS injection molding | ⊚ | X | Δ | Δ | Δ |
| Carbon black containing PPS injection molding | ⊚ | Δ | Δ | Δ | Δ |

⊚: Excellent
○: Good
Δ: Fairly good
X: Poor

Although the stainless sheet metal worked article has a relatively good electrical stability and can be obtained at a low cost, it is inferior in dimensional accuracy, strength, impact resistance and vibration damping properties. Thus, it is not suitable for the materials of the primary portion. On the contrary, a zinc alloy die casting, an aluminum alloy die casting, a zinc alloy injection molding and an aluminum alloy injection molding are excellent in strength and impact resistance, and dimensional accuracy, electrical stability and vibration damping properties thereof are within allowable limits, they are suitable for the materials of the primary portion. In addition, a lead alloy injection molding is particularly excellent in vibration damping properties. Thus, by using materials having high mechanical strength and vibration damping properties for the mount and by using materials having high sliding properties for the tape guide, mechanical vibration transmitted to the mount from the outside can be cut off. Furthermore, flaking of magnetic powder due to sliding of the magnetic tape can be prevented and wear of the tape guide can be also prevented. Still further, even if the entire mount is charged from unknown cause, the mount can be immediately discharged because the mount which is mainly formed of the material of the primary portion has a grounding function.

A method of manufacturing an integral unit of the mount and the first and second tape guides when a metals is used for the material of the primary portion will now be described.

Firstly, a metallic material having a low melting point, for example, 450° C. or less is injection molded into a die for use in molding the primary portion so as to form the primary portion. Then, a resin is injection molded into a die for use in molding the secondary portion to obtain a predetermined molding. According to this method, the integral unit can be formed by combining the resin with the metallic material without use of an insert molding method or the like.

In the above description, a metal is used as the material of the primary portion. However, the material of the primary side is not limited to the metal, and a non-metallic material, a compound of a metal and a non-metal may be used for the material of the primary portion. For example, the material to be used for the primary side may be suitably selected from zinc, tin, lead, aluminum, bismuth, terbium, tellurium, gadolinium, thallium, astatine, polonium, selenium, lithium, indium, iodine, sulfur, sodium, potassium, phosphorus, rubidium, cesium, francium, gallium, and compounds thereof.

The above-mentioned matters can be applied not only to the conventional magnetic head device provided with only the first tape guides but also to a magnetic head device having two or more of the first or the second tape guides.

The above features 3), 4) and 5) will now be described.

Figure 5A:
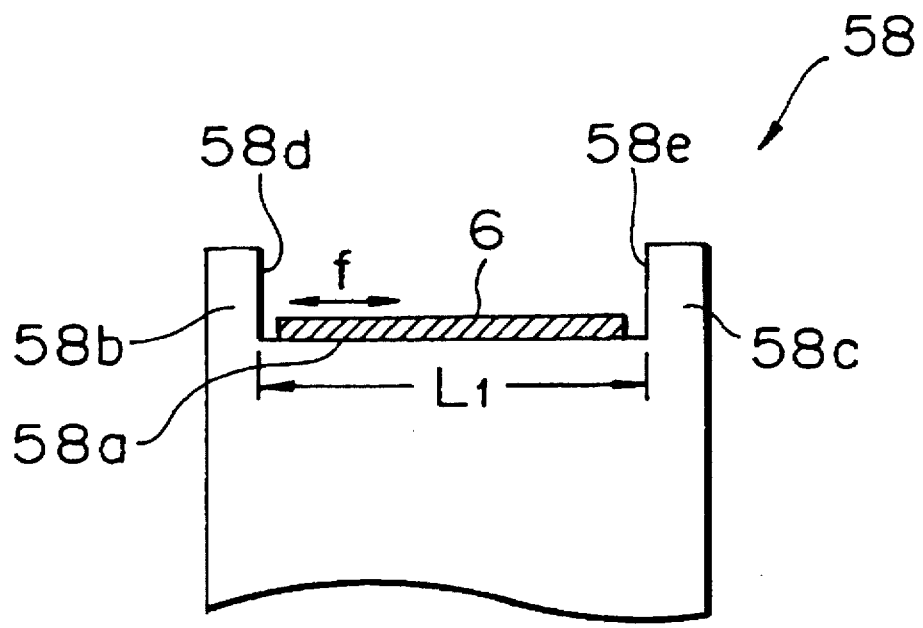
FIGS. 5A and 5B are views showing a running state of a magnetic tape in the general tape guides.
Figure 5B:
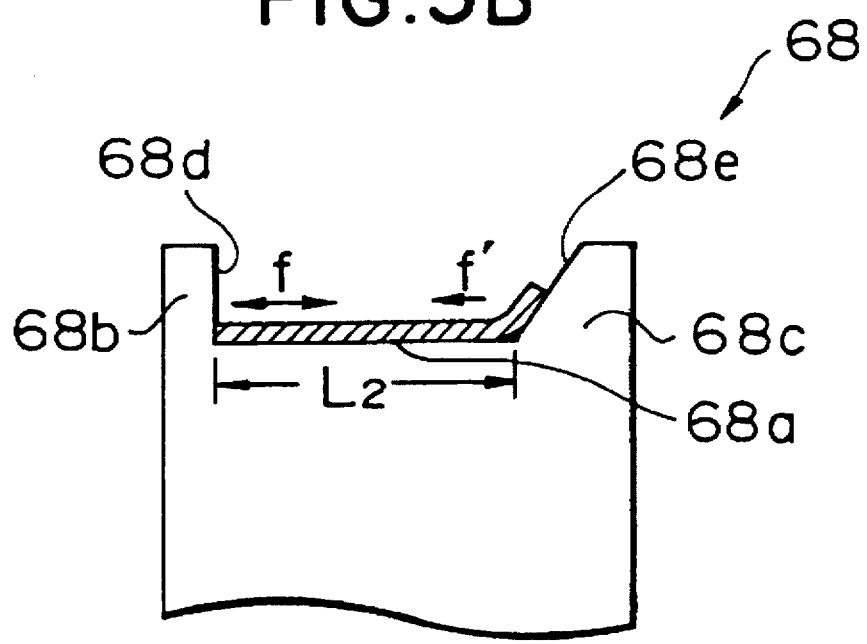

FIGS. 5A and 5B show a running state of the magnetic tape in the general tape guides.

Firstly, when inner walls of both of the projections 58b and 58c of a tape guide 58 are perpendicular surfaces 58d and 58e (hereinafter, referred to as perpendicular guides) as shown in FIG. 5A, external forces f may act across the width of a magnetic tape 6 during running of the magnetic tape 6. These external forces may be the forces due to deviation of the magnetic head device upon mounting thereof, or the forces due to running irregularities of the magnetic tape. At this time, the edges of the magnetic tape 6 in the width direction thereof may abut against the perpendicular surface 58d or the perpendicular surface 58e. Thus, the width L1 of the guide is set wider than the width of the magnetic tape 6 to minimize damage to the magnetic tape 6. This makes it is difficult for the magnetic tape 6 to come off the tape guide 58 and reduces its tendency to deform, thereby improving follow-up properties of the magnetic head device. That is, the tape guide 58 has a function of restricting a running range of the magnetic tape 6 in the width direction thereof. However, since the tape guide 58 has a large guide width L1, it is difficult to control the magnetic tape 6 securely so that the magnetic head device having the tape guide 58 may have a somewhat inferior phase properties.

When an inner wall of the projection 68b of the tape guide 68 is a perpendicular surface 68d and an inner wall of the projection 68c is an inclined surface 68e (hereinafter, referred to as inclined guides) as shown in FIG. 5B, a guide width L2 is generally set smaller than the width of the magnetic tape 6. At this time, external forces f may act across the width of the magnetic tape 6 during running of the magnetic tape 6. In addition, controlling force f' may always act on the magnetic tape 6 due to sliding of end portion 6a of the magnetic tape 6 on the inclined surface 68e. The tape guide 68 has a function of controlling one edge portion of the magnetic tape 6 to the perpendicular surface 68d by means of resultant force of the external forces f and the restricting force f'. In this configuration, the magnetic tape 6 is controlled securely. Thus, the magnetic head device having the tape guide 68 is excellent particularly in phase properties. However, since the guide width L2 of the tape guide 68 is small and the inner wall of the projection 68c is the inclined surface 68e, the magnetic tape 6 tends to come off the tape guide 68 when greater external forces act thereon. Therefore, it is difficult to restrict a running range of the magnetic tape 6 in the width direction thereof so that the magnetic head device having the tape guide 68 may have a somewhat inferior follow-up properties.

Based on the foregoing description, which of the above perpendicular guides or inclined guides may be adopted to the first tape guides (tape guides close to the magnetic head) and the second tape guides (tape guides far away from the magnetic head) will be described.

The farther the tape guides are located away from the magnetic head, the greater the displacement of the magnetic tape in the width direction thereof and the greater the external forces f. Thus, by controlling the displacement of the magnetic tape in the width direction thereof to some extent at a position far from the magnetic head, the external forces f near the magnetic head can be reduced. Therefore, the tape guides capable of restricting the running range of the magnetic tape in the width direction thereof, i.e. the perpendicular guides may be desirably adopted to the second tape guides.

At the positions near the magnetic head, running stability of the magnetic tape is required. Moreover, since the perpendicular guides are adopted to the second tape guides, the external forces f are very small at the positions near the magnetic head. Thus, the tape guides capable of controlling one edge portion of the magnetic tape securely, i.e. the inclined guides may be desirably adopted to the first tape guides.

Therefore, when the inclined guides are adopted to the first tape guides and the perpendicular guides are adopted to the second tape guides, the running range of the magnetic tape in the width direction thereof can be restricted and the external forces f can be reduced by the second tape guides, and one edge portion of the magnetic tape can be securely controlled by the first tape guides. Thus, the magnetic head device having the first and second tape guides as described above has excellent stability of follow-up properties and phase properties.

On the contrary, when the perpendicular guides are adopted to the first and the second tape guides, respectively, the running range of the magnetic tape in the width direction thereof can be restricted by the first and second tape guides even if large external forces act on the magnetic tape. Thus, the magnetic head device having the above tape guides has excellent follow-up properties. However, since it is difficult to control securely one edge portion of the magnetic tape, the magnetic head device may have inferior (unstable) phase properties.

When the inclined guides are adopted to the first and the second tape guides, respectively, one edge portion of the magnetic tape can be securely controlled by the first and second tape guides. Thus, the magnetic head device having the above tape guides is excellent in stability of phase properties. However, since the magnetic tape is weak to the large external forces, it is difficult to restrict the running range thereof in the width direction, and follow-up properties of the magnetic head device with the above tape guides is not so improved.

When the perpendicular guides are adopted to the first tape guides and the inclined guides are adopted to the second tape guides, it is difficult for the second tape guides to control the running range of the magnetic tape in the width direction thereof because the magnetic tape is weak to large external forces so that follow-up properties of the magnetic head device is not improved much. In addition, it is difficult for the first tape guides to control securely one edge portion of the magnetic tape so that the magnetic head device having such first and second tape guides as described above may have inferior phase properties.

As described above, by adopting the inclined guides to the first tape guides 38 and adopting the perpendicular guides to the second tape guides 48, a magnetic head device having excellent follow-up properties and phase properties can be provided. More preferably, the perpendicular surface 38d of one of the projections 38b of each of the first tape guides 38 and the perpendicular surface 48d of one of the projections 48b of each of the tape guide 48 may be aligned. This makes the running properties of the magnetic tape 6 more stable so that a magnetic head device having more excellent phase properties can be provided.

Furthermore, since the guide widths of the first tape guides are smaller than those of the second tape guides, large external forces acting on the magnetic tape can be reduced by the second tape guides, and the reduced external forces can be further reduced by the first tape guides. Therefore, a magnetic head device having more excellent follow-up properties can be obtained.

EXPERIMENTAL EXAMPLE

Figure 6:
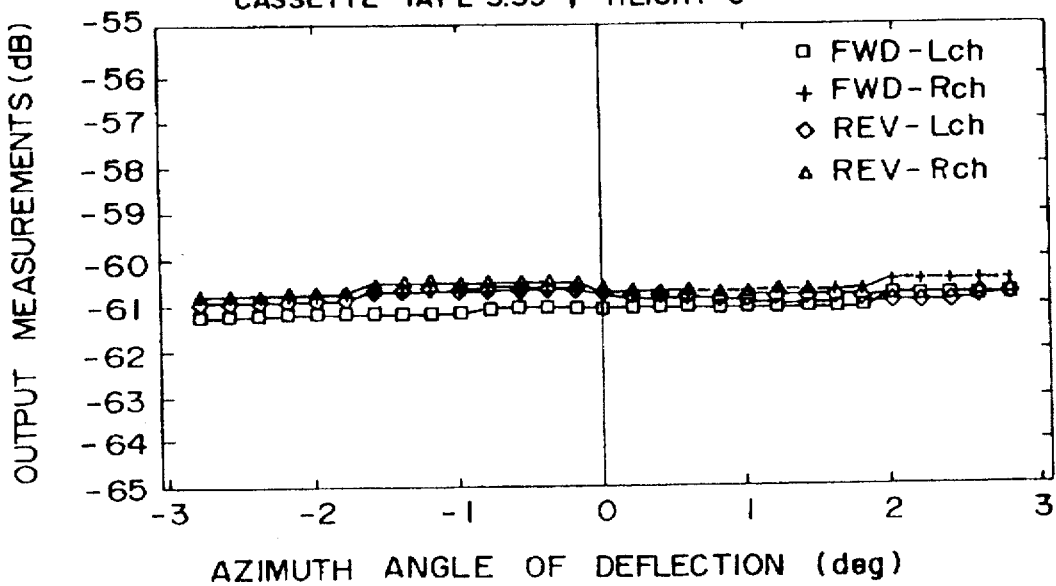
FIG. 6 is a graph showing output properties of a magnetic head device according to an embodiment of the present invention shown in FIG. 1.
Figure 7:
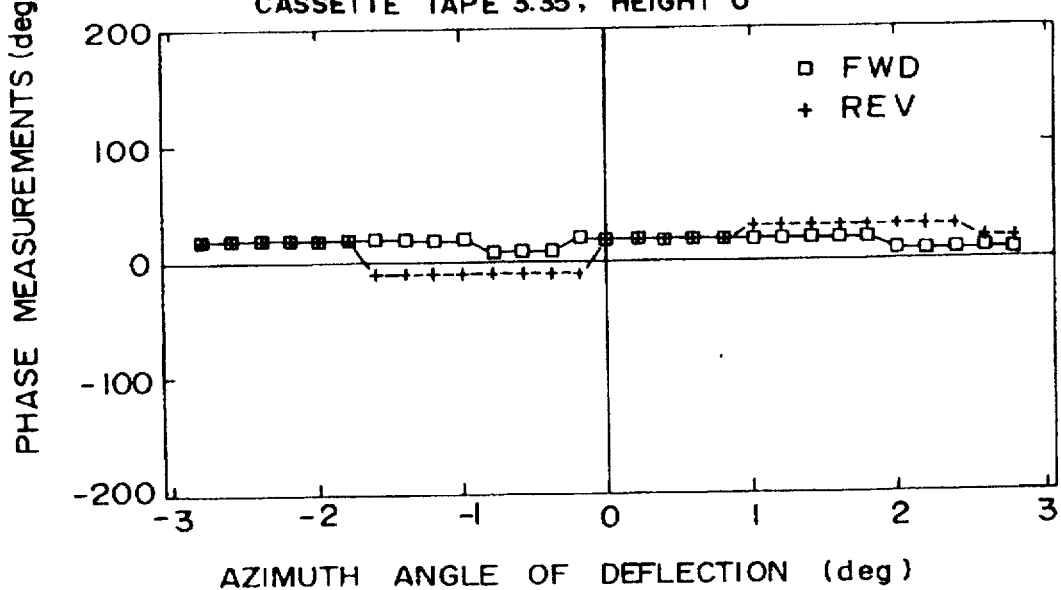
FIG. 7 is a graph showing phase properties of a magnetic head device according to an embodiment of the present invention shown in FIG. 1.
Figure 8:
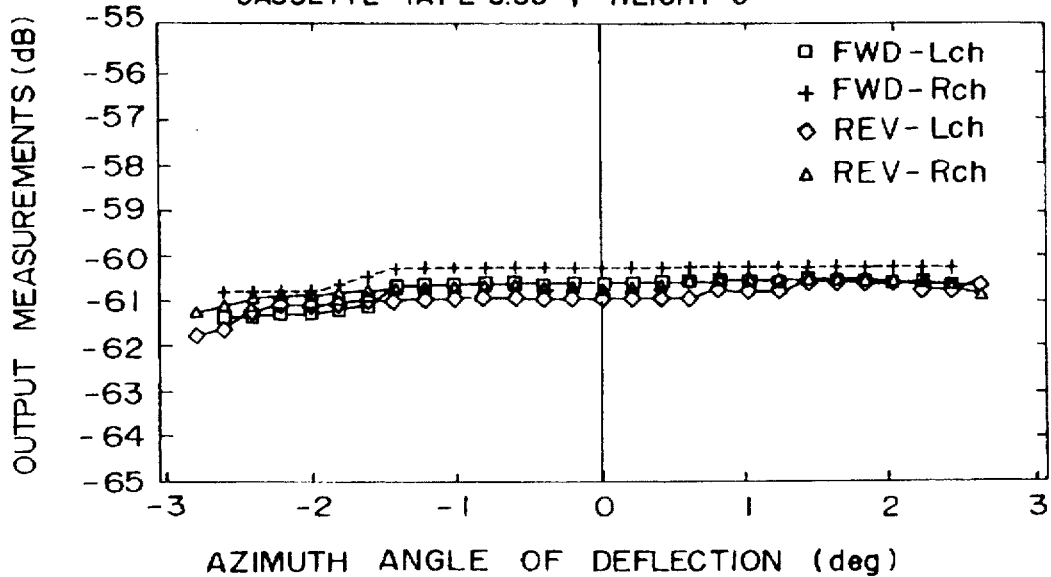
FIG. 8 is a graph showing output properties of a conventional magnetic head device shown in FIG. 12.
Figure 9:
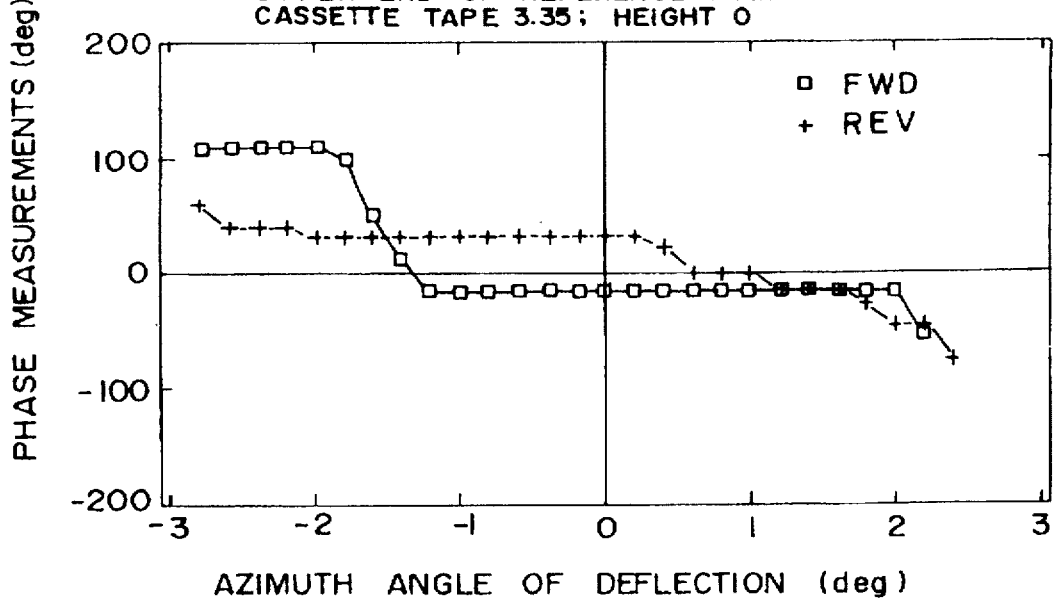
FIG. 9 is a graph showing phase properties of the conventional magnetic head device shown in FIG. 12.
Figure 10:
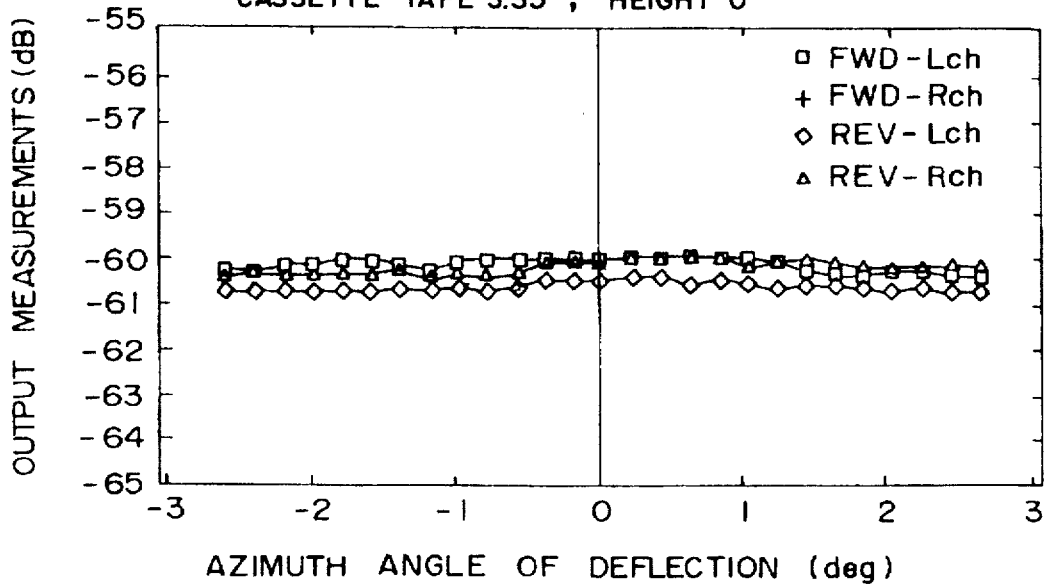
FIG. 10 is a graph showing output properties of a conventional magnetic head device shown in FIG. 14.
Figure 11:
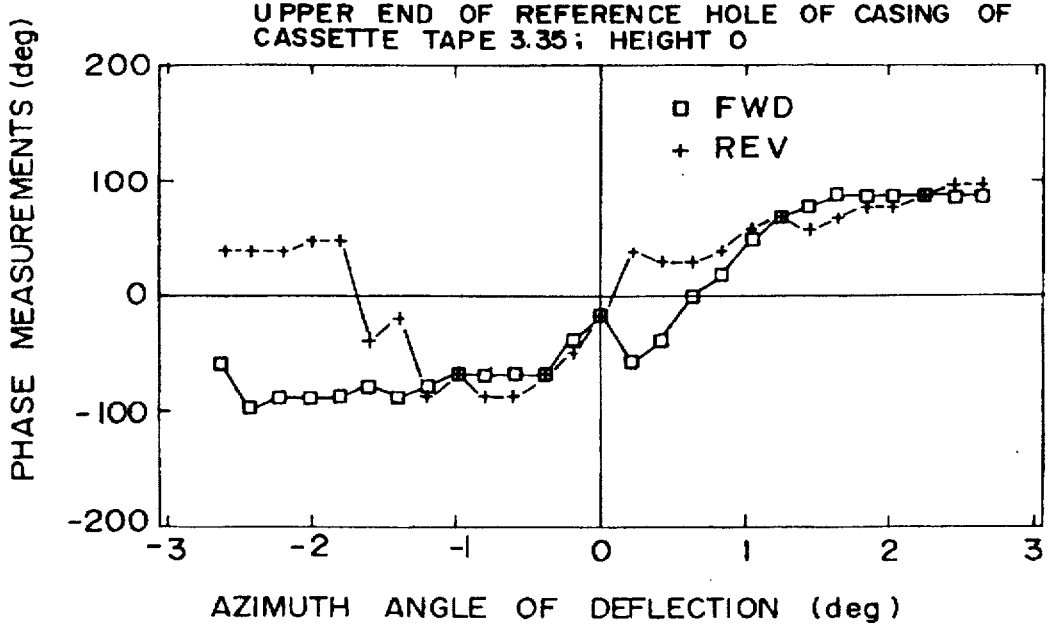
FIG. 11 is a graph showing phase properties of the conventional magnetic head device shown in FIG. 14.
Figure 12:
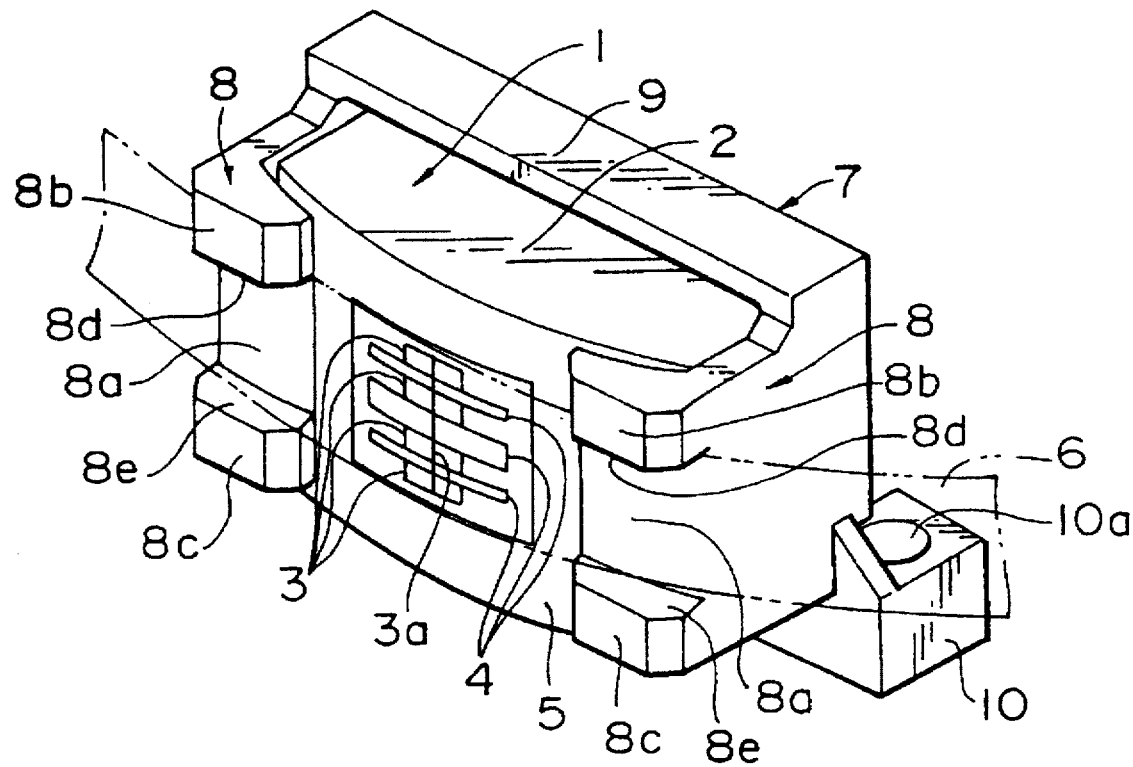
FIG. 12 is a perspective view showing a conventional magnetic head device.
Figure 13:
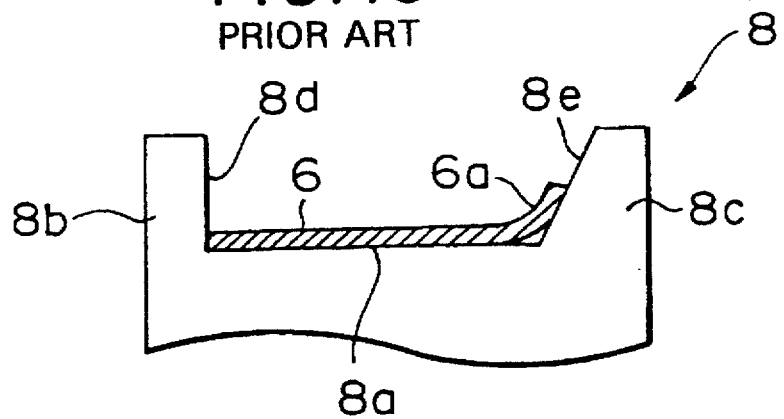
FIG. 13 is a view showing a running state of a magnetic tape in the magnetic head device shown in FIG. 12.
Figure 14:
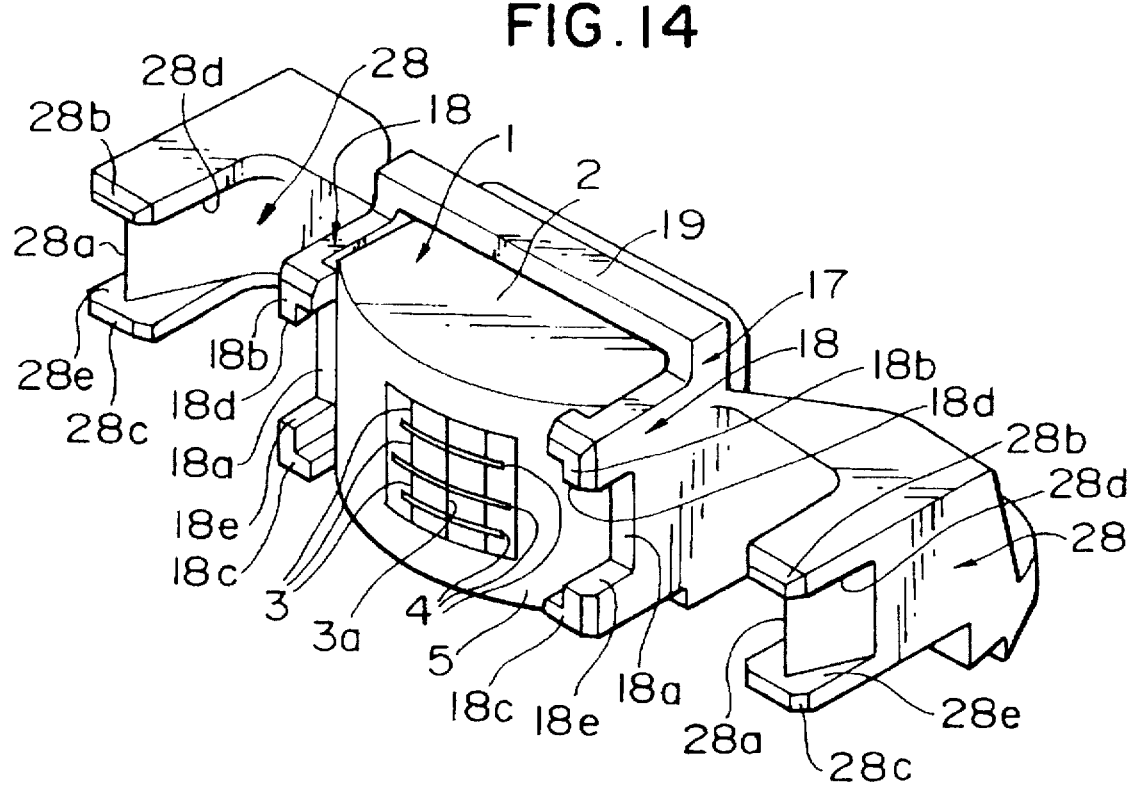
FIG. 14 is a perspective view showing a magnetic head device in which the conventional magnetic head device is integrally provided with tape guides to be inserted into tape guide insertion openings adjacent to magnetic head insertion opening formed in a casing of a cassette tape.
Figure 15:
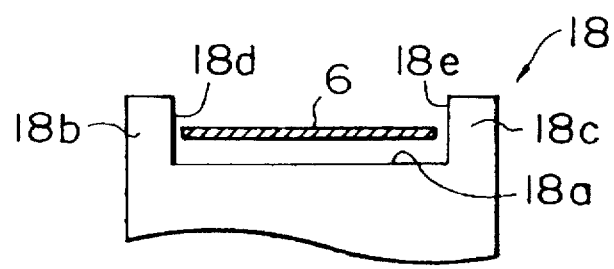
FIG. 15 is a view showing a running state of a magnetic tape in the first tape guides of the magnetic head device shown in FIG. 14.
Figure 16:
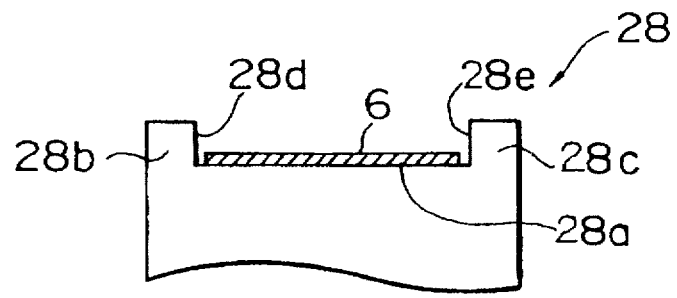
FIG. 16 is a view showing a running state of the magnetic tape in the second tape guides of the magnetic head device shown in FIG. 14.

In a magnetic head device according to the embodiment of the present invention shown in FIG. 1, outputs and phases thereof when deflecting azimuth angle were measured. The measurements are shown in FIGS. 6 and 7. As a comparative example, the measurements of the outputs and phases in the conventional magnetic head device shown in FIG. 12 are shown in FIGS. 8 and 9. Further, as an additional comparative example, the measurements of the outputs and phases in the conventional magnetic head device shown in FIG. 14 are shown in FIGS. 10 and 11. In FIGS. 6, 8 and 10, □ represents the left channel of the magnetic tape in the normal direction; + represents the right channel in the normal direction; ◊ represents the left channel of the magnetic tape in the reverse direction; and Δ represents the right channel in the reverse direction. In FIGS. 7, 9 and 11, □ represents the normal direction of the magnetic tape; and + represents the reverse direction of the magnetic tape.

It is apparent from FIG. 6 that outputs are extremely stable in the deflection range of azimuth angle of about −3 to +3 degrees. That is, the magnetic head device of the present invention follows the change of the azimuth. In addition, it is apparent from FIG. 7 that phase properties of the magnetic head device of the present invention is also remarkably stable.

On the other hand, in the conventional magnetic head device shown in FIG. 12, phase properties is stable in the deflection range of azimuth angle of −1.2 to +2.0 degrees in the normal direction, and −2.6 to +0.4 degrees in the reverse direction, as shown in FIG. 9. This is because that one edge portion of the magnetic tape can be controlled securely by the tape guides. However, it is apparent from FIG. 8 that the outputs are stable only in the deflection range of azimuth angle of −1.4 to +2.4 degrees, and that the follow-up properties with respect to the azimuth is somewhat inferior. This is because that the running range of the magnetic tape in the width direction thereof is not restricted at the positions far from the magnetic head.

Furthermore, in the conventional magnetic head device shown in FIG. 14, it is apparent from FIG. 10 that outputs are stable in the deflection range of azimuth angle of about −3 to +3 degrees. This is because that the running range of the magnetic tape in the width direction thereof can be restricted at the positions far from the magnetic head. However, it is apparent from FIG. 11 that phase properties are remarkably unstable. This is because that one edge portion of the magnetic tape cannot be controlled securely by the tape guides.

In the present invention as described above, the magnetic tape must be slid on the first and second tape guides. Therefore, the above features 1) and 2) are desirably adopted.

Although the present invention has been described with respect to a magnetic head device provided with one pair of the first tape guides and one pair of the second tape guides, the present invention is not limited thereto. It is a matter of course that the present invention is applicable to a magnetic head device provided with two or more pairs of the first tape guides or the second tape guides.

According to the first aspect of the invention, the materials suitable for the function of the tape guides can be used for the tape guides, and the materials suitable for the function of the mount can be used for the mount. In addition, since the mount and tape guides, which are formed of different materials, can be combined to form an integral unit, resonance properties can be controlled, as compared with the unit formed of a single material.

According to the second aspect of the invention, the materials suitable for the function of the tape guides can be used for the tape guides, and the materials suitable for the function of a large mount can be used for the large mount. In addition, since the mount, the first tape guides and the second tape guides, which are formed of different materials, can be combined to form an integral unit, resonance properties can be controlled, as compared with the unit formed of a single material.

According to the third aspect of the invention, the positions of runners and gates upon molding can be arbitrarily provided in good balance by integrally molding the first and second tape guides. The number of positions of the gates can be reduced to two. By this, filmy burrs which have been likely to be generated on die surfaces due to turbulence in gate balance upon molding the secondary side may be removed. In addition, defects which have caused on sliding surfaces of the first or the second tape guides due to surface roughness such as a flow mark and a gas mark (for example, burn mark, silver streak, haze and mold deposit) can be eliminated by the change of the flow of resin. Furthermore, generating sections of welds produced by a collision of resins poured into the die from different sides can be formed at positions far from the sliding surfaces, and the number of generating sections of welds can be reduced. This can improve strength of the whole molded article.

According to the fourth and fifth aspects of the invention, by using the high-accuracy material for the mount and by using the materials having high sliding properties for the tape guides, it is possible to attach the mount securely to the magnetic head device upon fastening threads, and at the same time, it is possible to provide a mount which does not change in scale with the change of environment such as temperature and humidity. Furthermore, falling-off of magnetic powder due to the sliding of the magnetic tape can be prevented, and wear of the tape guides can be also prevented.

According to the sixth and seventh aspects of the invention, by using the material having mechanical properties and vibration damping properties for the mount and by using the materials having high sliding properties for the tape guides, it is possible to cut off mechanical vibrations transmitted to the mount from the outside. Furthermore, falling-off of magnetic powder due to the sliding of the magnetic tape can be prevented, and wear of the tape guides can be also prevented.

According to the eighth aspect of the invention, the inner wall of one of the projections of each of the first tape guides is formed as the perpendicular surface, the inner wall of the other projection of each of the first tape guides is formed as the inclined surface, and the inner walls of both of projections of the second tape guides are formed as perpendicular surfaces. Thus, the running range of the magnetic tape in the width direction thereof near the magnetic head can be restricted by controlling the displacement of the magnetic tape in the width direction thereof to some extent by the second tape guides at the positions far from the magnetic head, and one edge portion of the magnetic tape can be controlled by the first tape guides at the positions near the magnetic head. Therefore, a magnetic head device having excellent stability of follow-up properties and phase properties can be provided.

According to the ninth aspect of the invention, the perpendicular surface of one of the projections of each of the first tape guides and the perpendicular surface of one of the projections of each of the second tape guides are aligned. Thus, running properties of the magnetic tape becomes more stable so that a magnetic head device having more excellent phase properties can be provided.

According to the tenth aspect of the invention, the guide widths of the first tape guides are smaller than those of the second tape guides. Thus, large external forces acting on the magnetic tape can be reduced by the second tape guides, and the reduced external forces can be further reduced by the first tape guides. Therefore, a magnetic head device having more excellent follow-up properties can be provided.

What is claimed is:

1. A magnetic head device comprising:

a magnetic head;

a mount on which said magnetic head is provided; and tape guides which are provided on said mount, wherein each of said tape guides comprises a primary portion unitarily formed with said mount from a first material and including a hole, and a secondary portion formed from a second material different from said first material, said second material being molded onto the primary portion such that the secondary portion includes a portion disposed in the hole.

2. A magnetic head device according to claim 1, wherein said mount is formed of a high-accuracy material and said second material of said tape guides has low friction properties.

3. A magnetic head device according to claim 2, wherein a main ingredient of said mount consists of at least one of polyphenylene sulfide, a liquid crystal polymer, polyether imide and aromatic polyamide, and wherein a main ingredient of said second material of said tape guides consists of nylon 12.

4. A magnetic head device according to claim 1, wherein said mount is formed of a material having high mechanical properties and vibration damping properties, and wherein said second material of said tape guides has low friction properties.

5. A magnetic head device according to claim 4, wherein a main ingredient of said mount consists of at least one of zinc alloy, lead alloy and aluminum alloy, and wherein a main ingredient of said second material of said tape guides consists of nylon 12.

6. A magnetic head device comprising:

a magnetic head;

a mount on which said magnetic head is provided;

first tape guides provided on said mount at positions approximately adjacent to said magnetic head; and second tape guides provided on said mount at positions separated from said magnetic head, wherein each of said first and second tape guides comprises a primary portion unitarily formed with said mount from a first material and including a hole, and a secondary portion formed from a second material different from said first material, said second material being molded onto the primary portion such that the secondary portion includes a portion disposed in the hole.

7. A magnetic head device according to claim 6, wherein one of said first and second tape guides on one of a magnetic tape lead-in side and a magnetic tape lead-out side are integrally molded.

8. A magnetic head device according to claim 6, wherein said mount is formed of a high-accuracy material and said second material of said tape guides has low friction properties.

9. A magnetic head device according to claim 8, wherein a main ingredient of said mount consists of at least one of polyphenylene sulfide, a liquid crystal polymer, polyether imide and aromatic polyamide, and wherein a main ingredient of said second material of said tape guides consists of nylon 12.

10. A magnetic head device according to claim 9, wherein an inner wall of a first projection of each of said first tape guides is perpendicular relative to a surface of the mount and an inner wall of a second projection of each of said first tape guides is inclined relative to the surface, and wherein inner walls of projections of said second tape guides are perpendicular relative to the surface.

11. A magnetic head device according to claim 10, wherein the perpendicular inner walls of the first projections of said first tape guides and the perpendicular inner walls of the projections of said second tape guides are aligned to form a tape path.

12. A magnetic head device according to claim 11, wherein guide widths of said first tape guides are smaller than those of said second tape guides.

13. A magnetic head device according to claim 6, wherein said mount is formed of a material having high mechanical properties and vibration damping properties, and wherein said second material of said first and second tape guides has high sliding properties.

14. A magnetic head device according to claim 13, wherein a main ingredient of said mount consists of at least one of zinc alloy, lead alloy and aluminum alloy, and wherein a main ingredient of said second material of said tape guides consists of nylon 12.

15. A magnetic head device according to claim 14, wherein an inner wall of a first projection of each of said first tape guides is perpendicular relative to a surface of the mount and an inner wall of a second projection of each of said first tape guides is inclined relative to the surface, and wherein inner walls of projections of said second tape guides are perpendicular relative to the surface.

16. A magnetic head device according to claim 15, wherein the perpendicular inner walls of the first projections of said first tape guides and the perpendicular inner walls of the projections of said second tape guides are aligned to form a tape path.

17. A magnetic head device according to claim 16, wherein guide widths of said first tape guides are smaller than those of said second tape guides.

* * * * *